3,107,242
Patented Oct. 15, 1963

1

3,107,242
NOVEL SUBSTITUTED PHENOTHIAZINES AND INTERMEDIATES THEREFOR
Paul N. Craig, Roslyn, Pa., assignor to Smith Kline & French Laboratories, Philadelphia, Pa., a corporation of Pennsylvania
No Drawing. Filed Apr. 11, 1961, Ser. No. 102,124
3 Claims. (Cl. 260—243)

This invention relates to novel substituted phenothiazines and intermediates useful for their preparation. More specfically, this invention relates to nuclear pentafluorosulfur substituted phenothiazines and the corresponding diphenylamine intermediates. These novel substituted phenothiazines are useful as intermediates for the preparation of 10-aminoalkylated phenothiazine derivatives which are useful as tranquilizers, antiemetics, antihistamines, potentiators and general central nervous system depressants. The preparation of these 10-aminoalkylated derivatives from the novel phenothiazines of this invention is described fully hereinbelow.

The novel pentafluorosulfur substituted phenothiazines of this invention are represented by the following general structural formula:

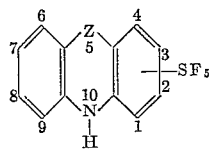

Formula I when Z represents S, SO, or SO$_2$, advantageously S.

The 2-pentafluorosulfurphenothiazine compound of Formula I is especially advantageous.

The pentafluorosulfurphenothiazines are prepared as shown by the following synthetic scheme:

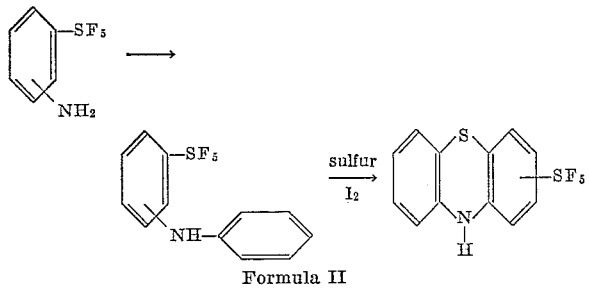

Formula II

Thus, the aminophenylsulfur pentafluoride (obtained by catalytic reduction of the corresponding nitro compound) is acetylated with acetic anhydride and the resulting acetamide is condensed with bromobenzene under alkaline conditions and in the presence of cuprous iodide and copper-bronze powder, and then hydrolyzed with concentrated mineral acid to give the diphenylamine of Formula II above. The latter compound is then thionated to give the phenothiazine. In this step, the substituted diphenylamine is heated with from 1.8 to 2.0 equivalents of sulfur in the presence of a catalytic amount of iodine, for instance from 0.5 to 5.0% by weight of the diphenylamine. The reaction mixture is advantageously heated at from about 120 to 230° C. for from one-quarter to five hours. The reaction may be run with or without a solvent. Exemplary of suitable, nonreactive organic solvents are xylene or o-dichlorobenzene. Preferably the reaction is run without a solvent in an atmosphere of dry nitrogen at from 140–190° C. for from one to three hours. The product is isolated by dissolving the reaction mixture in boiling benzene and then removing the solvent in vacuo. The residue is purified by recrystallization and/or vacuum sublimation.

The above diphenylamines of Formula II are useful as intermediates to prepare the corresponding phenothiazines as is obvious from the above description.

The sulfoxide derivatives of Formula I are prepared conveniently by oxidizing the phenothiazine in an unreactive solvent such as methanol, ethanol or water with one equivalent of an oxidizing agent, preferably 30% hydrogen peroxide solution at a temperature up to the reflux temperature of the reaction mixture.

The corresponding sulfone derivatives are prepared by oxidizing the phenothiazine in glacial acetic acid with at least two equivalents of an oxidizing agent, preferably an excess of 30% hydrogen peroxide solution at a temperature up to 50° C.

10-aminoalkylated pentafluorosulfurphenothiazines useful as antiemetics, tranquilizers, antihistamines, potentiators and central nervous system depressants are readily prepared from the phenothiazine derivatives of Formula I and are represented by the following general structural formula:

Formula III where Z is S, SO or SO$_2$; A is an alkylene chain of from 2 to 6 carbon atoms, straight or branched; and Y is dialkylamino (the alkyl moieties having from 1 to 6 carbon atoms) or a monocyclic heterocyclic amino moiety containing from 4 to 12 carbon atoms, and containing a maximum of two hetero ring members selected from the group of oxygen nitrogen and sulfur, such as pyrrolidino, morpholino, thiamorpholino, piperidino or N'-substituted-N-piperazino, for example N'-methyl, hydroxyethyl, acetoxyethyl or hydroxyethoxyethyl-N-piperazino. Also, the phenothiazine nucleus may be substituted further with a halogen, alkyl, alkoxy, alkylthio or trifluoromethyl group and the nuclear sulfur atom may be oxidized to the sulfoxide or sulfone. The term aminoalkyl is used generically herein to include both the dialkylaminoalkyl and heterocyclic aminoalkyl moieties as set forth for Formula III above.

Thus, the pentafluorosulfurphenothiazine of Formula I is condensed with a reactive tertiary aminoalkyl ester having the desired dialkylaminoalkyl or heterocyclic aminoalkyl group to form the desired 10-aminoalkyl pentafluorosulfurphenothiazine. Preferably the condensation is carried out by reacting the aminoalkyl chloride or bromide with the phenothiazine at a temperature of from 30–160° C. in an unreactive solvent such as benzene, toluene or xylene for from 30 minutes to 36 hours. A suitable acid-binding agent is employed usually, for example an alkali metal amide, preferably sodium, lithium or potassium amide.

The preferred method of alkylation is to react the pentafluorosulfurphenothiazine with an aminoalkyl chloride or bromide with a slight excess of sodium or potassium amide in refluxing benzene or toluene for from 3 to 12 hours.

The alkylated phenothiazine product is isolated by diluting the reaction mixture with water, extracting the organic layer with dilute hydrochloric acid, neutralizing the acid extract and extracting again with benzene. The dried benzene extract is evaporated to give the desired product.

The following examples illustrate the preparation of the diphenylamine and phenothiazine compounds of this invention and further an exemplary preparation of 10-aminoalkylated pentafluorosulfurphenothiazines.

Example 1

Twenty-three grams of m-nitrophenylsulfur pentafluoride in 125 ml. of glacial acetic acid is hydrogenated (70 p.s.i.) at room temperature for two hours in the presence of 0.6 g. of platinum oxide. After the theoretical amount of hydrogen is taken up, the catalyst is removed and 12.0 g. of acetic anhydride is added. The solution is kept at room temperature for 60 hours and then heated at 50–75° C. for six hours. The solvent is removed in vacuo and the residue recrystallized to give m-acetamidophenylsulfur pentafluoride, M.P. 135–136.5° C.

A mixture of 18.2 g. of the above acetamide, 22.0 g. of bromobenzene, 10.5 g. of anhydrous granular potassium carbonate, 0.4 g. of cuprous iodide and 0.4 g. of copper-bronze powder in 70 ml. of nitrobenzene is stirred and heated at 185–205° C. (internal temperature) for twenty hours. The solvent is removed with steam and the separated residue is refluxed for four and one-half hours with a solution of 25 ml. of concentrated hydrochloric acid in 50 ml. of ethanol. The mixture is evaporated almost to dryness in vacuo, diluted with 10% sodium hydroxide solution and then extracted with ether. The ether extract is created with charcoal, filtered and the solvent is removed under reduced pressure. The residue is vacuum distilled using a 6″ Vigreux column to give 3-pentafluoro-sulfurdiphenylamine, B.P. 116° C. at less than 0.1 mm.

A mixture of 3.0 g. of 3-pentafluorosulfurdiphenyl-amine, 0.6 g. of sublimed sulfur and 90 mg. of iodine under nitrogen is heated in a bath at 170–180° C. for 1.75 hours. The reaction mixture is taken up in boiling benzene, treated with charcoal and the solvent subsequently removed in vacuo. Trituration of the residue with petroleum ether gives 2-pentafluorosulfurphenothiazine which after sublimation at 140° C. below 0.1 mm. and recrystallization melts at 186.5–187.5° C.

Example 2

A suspension of 32.4 g. of 2-pentafluorosulfurphenothiazine (prepared as in Example 1) and 4.1 g. of sodamide in 150 ml. of dry toluene is stirred vigorously and heated at reflux for one hour. A solution of 14.5 g. of 3-chloro-1-dimethylaminopropane in 25 ml. of toluene is then added slowly and the mixture refluxed for four hours. Water is slowly added to the cooled reaction mixture and the separated toluene layer is extracted with dilute hydrochloric acid. The acid extract is neutralized, extracted with benzene and the dried organic extract evaporated to yield 10 - (3'-dimethylaminopropyl)-2-pentafluorosulfur-phenothiazine. The hydrochloride is prepared by treating the free base with ethereal hydrogen chloride.

Example 3

A mixture of 16.2 g. of 2-pentafluorosulfurphenothiazine (prepared as in Example 1), 2.5 g. of sodamide and 10.5 g. of 1-(3'-chloropropyl)-4-methylpiperazine in 200 ml. of xylene is stirred and refluxed for five hours. The reaction mixture is treated with water and the xylene layer extracted with dilute hydrochloric acid. The acid extract is neutralized with aqueous ammonia and the product taken up in benzene. Removal of the solvent yields 10-[3'-(4″-methyl-1″-piperazinyl)-propyl]-2-penta-fluorosulfurphenothiazine. Treating the free base with maleic acid in ethyl acetate solution gives the dimaleate salt.

Example 4

A mixture of 1.0 g. of 2-pentafluorosulfurphenothiazine (prepared as in Example 1) and 1 mole equivalent of hydrogen peroxide supplied by 30% hydrogen peroxide solution in 25 ml. of methanol is refluxed for 10 hours. The volatiles are removed in vacuo to leave the 2-pentafluorosulfurphenothiazine-5-oxide.

Example 5

A mixture of 1.0 g. of 2-pentafluorosulfurphenothiazine (prepared as in Example 1), 3 mole equivalents of hydrogen peroxide supplied by 30% hydrogen peroxide solution and 15 ml. of glacial acetic acid (containing 0.1 ml. of sulfuric acid) is warmed at 40° C. for 24 hours. Water is then added and the cooled mixture made strongly alkaline with sodium hydroxide solution. This mixture is extracted with benzene and the solvent removed subsequently to yield 2-pentafluorosulfurphenothiazine-5,5-dioxide.

What is claimed is:
1. A chemical compound having the formula:

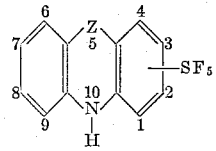

in which Z is a member selected from the group consisting of S, SO and $SO_2$.

2. A chemical compound having the formula:

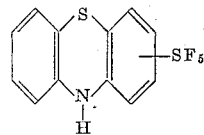

3. 2-pentafluorosulfurphenothiazine.

References Cited in the file of this patent

UNITED STATES PATENTS

| | | |
|---|---|---|
| 2,919,272 | Craig | Dec. 29, 1959 |
| 2,928,870 | Hasek | Mar. 15, 1960 |

OTHER REFERENCES

Emeleus et al.: J. Chem. Soc., 1946, pages 1130–1131.
Chemical Abstracts, volume 53, columns 21, 765–6 (1959).
Sheppard: Journ. of the Am. Chem. Soc., volume 82, pages 4751 to 4752 (September 5, 1960).